(12) United States Patent
Kim et al.

(10) Patent No.: US 10,133,170 B2
(45) Date of Patent: Nov. 20, 2018

(54) AIR CONDITIONER AND METHOD FOR CONTROLLING THE SAME

(71) Applicant: Samsung Electronics Co., Ltd., Suwon-si (KR)

(72) Inventors: Jae-jeong Kim, Seoul (KR); Jung-ah Seung, Guri-si (KR); So-young Yun, Seoul (KR); Ji-yoon Yoon, Seoul (KR); Mi-young Lee, Seoul (KR); Seong-ryeol Myeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/494,878

(22) Filed: Apr. 24, 2017

(65) Prior Publication Data

US 2017/0356672 A1    Dec. 14, 2017

(30) Foreign Application Priority Data

Jun. 13, 2016    (KR) ........................ 10-2016-0073071

(51) Int. Cl.
| | |
|---|---|
| *G03B 21/14* | (2006.01) |
| *G03B 21/16* | (2006.01) |
| *G03B 21/28* | (2006.01) |
| *F24F 1/00* | (2011.01) |
| *G03B 29/00* | (2006.01) |
| *G03B 21/10* | (2006.01) |
| *G03B 21/62* | (2014.01) |
| *F24F 11/30* | (2018.01) |
| *F24F 11/62* | (2018.01) |
| *G03B 21/00* | (2006.01) |
| *F24F 11/56* | (2018.01) |
| *F24F 11/52* | (2018.01) |

(52) U.S. Cl.
CPC ............ *G03B 21/28* (2013.01); *F24F 1/0007* (2013.01); *F24F 11/30* (2018.01); *F24F 11/62* (2018.01); *G03B 21/10* (2013.01); *G03B 21/145* (2013.01); *G03B 21/16* (2013.01); *G03B 21/62* (2013.01); *G03B 29/00* (2013.01); *F24F 11/52* (2018.01); *F24F 11/56* (2018.01); *F24F 2001/004* (2013.01); *G03B 21/005* (2013.01)

(58) Field of Classification Search
CPC ....... G03B 21/16; G03B 21/10; G03B 21/145
USPC ................................................... 353/122, 78
See application file for complete search history.

(56) References Cited

U.S. PATENT DOCUMENTS

| | | | |
|---|---|---|---|
| 5,521,659 | A | 5/1996 | Arnott |
| 6,276,802 | B1 | 8/2001 | Naito |

(Continued)

FOREIGN PATENT DOCUMENTS

| | | |
|---|---|---|
| EP | 2363653 | 9/2011 |
| JP | 2006-11783 | 1/2006 |

(Continued)

OTHER PUBLICATIONS

Tetsuya; JP2010-139188; Jun. 24, 2010; Machine Translation in English.*

(Continued)

*Primary Examiner* — Ryan Howard
(74) *Attorney, Agent, or Firm* — Staas & Halsey LLP

(57) ABSTRACT

An air conditioner having a projector and a method for controlling the same output an image to a display plate of the air conditioner and to the periphery of the air conditioner.

17 Claims, 15 Drawing Sheets

(56) References Cited

U.S. PATENT DOCUMENTS

| | | |
|---|---|---|
| 6,634,756 B1 | 10/2003 | Shimizu |
| 6,728,032 B2 | 4/2004 | Peterson et al. |
| 6,752,500 B1 | 6/2004 | Yoshii et al. |
| 7,264,357 B2 | 9/2007 | Arai et al. |
| 7,329,004 B2 | 2/2008 | Arai et al. |
| 7,342,724 B2 | 3/2008 | Hirata et al. |
| 7,567,380 B2 | 7/2009 | Peterson et al. |
| 7,864,436 B2 | 1/2011 | Machii |
| 7,909,471 B2 | 3/2011 | Noji |
| 7,922,339 B2 | 4/2011 | Sokolov et al. |
| 7,926,952 B2 | 4/2011 | Wan |
| 8,011,789 B2 | 9/2011 | Murata |
| 8,052,290 B2 | 11/2011 | Seki |
| 2005/0012995 A1 | 1/2005 | Chang |
| 2005/0094103 A1* | 5/2005 | Robinson ............ G02B 17/0621 353/10 |
| 2006/0139577 A1 | 6/2006 | Ikeda et al. |
| 2006/0274283 A1 | 12/2006 | Lin et al. |
| 2006/0285081 A1 | 12/2006 | Moon et al. |
| 2007/0013817 A1 | 1/2007 | Zhang et al. |
| 2007/0222951 A1 | 9/2007 | Makida et al. |
| 2007/0229949 A1 | 10/2007 | Suko et al. |
| 2007/0296920 A1 | 12/2007 | Mezouari et al. |
| 2008/0002067 A1 | 1/2008 | Matsuoka |
| 2008/0024735 A1 | 1/2008 | Kanagawa et al. |
| 2008/0024737 A1 | 1/2008 | Iwasaki |
| 2008/0024862 A1 | 1/2008 | Kuo-Tsung |
| 2008/0252861 A1 | 10/2008 | Niikura et al. |
| 2009/0002818 A1 | 1/2009 | Iwabu et al. |
| 2009/0122274 A1* | 5/2009 | Saito ...................... G03B 21/30 353/85 |
| 2009/0141190 A1 | 6/2009 | Kroll |
| 2010/0157256 A1* | 6/2010 | Itoh ........................ G03B 21/10 353/78 |
| 2011/0242497 A1* | 10/2011 | Fukano ................ G02B 26/008 353/31 |
| 2012/0154663 A1 | 6/2012 | Park et al. |
| 2012/0327297 A1 | 12/2012 | Roberts et al. |
| 2015/0215911 A1 | 7/2015 | Dimou |

FOREIGN PATENT DOCUMENTS

| | | |
|---|---|---|
| JP | 2010-139188 | 6/2010 |
| KR | 10-2008-0049476 | 6/2008 |
| KR | 10-2009-0062366 | 6/2009 |
| KR | 10-2010-0055910 | 5/2010 |
| KR | 10-2012-0067766 | 6/2012 |
| KR | 10-2014-0041760 | 4/2014 |

OTHER PUBLICATIONS

Extended European Search Report dated Oct. 25, 2017 in European Patent Application No. 17170275.6.

* cited by examiner

AIR CONDITIONER AND METHOD FOR CONTROLLING THE SAME

CROSS-REFERENCE TO RELATED APPLICATIONS

This application claims priority from Korean Patent Application No. 10-2016-0073071 filed on Jun. 13, 2016 in the Korean Intellectual Property Office, the disclosure of which is incorporated herein by reference in its entirety.

BACKGROUND OF THE INVENTION

Field of the Invention

The present disclosure relates to an air conditioner and a method for controlling the same, and more particularly, to an air conditioner and a method for controlling the same, which can project a text, an image, and/or a moving image from an inside of the air conditioner to an outer surface thereof.

Description of the Related Art

An air conditioner means a device which can perform conditioning of indoor air using a refrigeration cycle that uses a refrigerant as a working fluid. The refrigerant cycle may include a compressor, a condenser, an expansion valve, and an evaporator.

The air conditioner is provided with a fan and a heat exchanger that are installed inside a main body that forms an external appearance of the air conditioner. Indoor air that is sucked through a suction port that is formed on the main body and the fan that is provided inside the main body may pass through the heat exchanger so as to be cooled, dehumidified, or heated. The cooled, dehumidified, or heated air may be discharged to the interior of a room through a discharge port that is formed on the main body.

The air conditioner may be classified into a split type air conditioner (in which an indoor unit and an outdoor unit are separately provided) and an integrated air conditioner (in which an indoor unit and an outdoor unit are integrally provided). The air conditioner may display the operation state (e.g., cooling or wind direction) thereof through a display (e.g., LCD or LED) that is located on the surface of the main body, or may receive a user input that corresponds to the operation of the air conditioner.

SUMMARY OF THE INVENTION

Exemplary embodiments of the present disclosure provide an air conditioner and a method for controlling the same, which can display an image that is output from a projector that is located inside the air conditioner on the surface of a housing and on the periphery of the housing.

Further, exemplary embodiments of the present disclosure provide an air conditioner and a method for controlling the same, which can output an image that is output from a projector that is located inside the air conditioner through a display plate through which the image penetrates and a side opening of a housing, and display the output image on the periphery of the housing.

Further, exemplary embodiments of the present disclosure provide an air conditioner and a method for controlling the same, which can select one of display of the image that is output from the projector that is located inside the air conditioner on the display plate through which the image penetrates and display of the image that is output through the side opening of the housing on the periphery of the housing in accordance with a distance between a user and the air conditioner.

Further, exemplary embodiments of the present disclosure provide an air conditioner and a method for controlling the same, which can selectively display an image that is output from a projector that is located inside the air conditioner on the surface of a housing or on the periphery of the housing.

According to an aspect of the present disclosure, an air conditioner includes a housing having a plurality of openings on a front surface thereof; a door plate located to correspond to a first opening among the plurality of openings; a display plate located on one side of the first opening to correspond to a second opening among the plurality of openings; a projector located inside the housing to project an image; and a controller configured to control the projector. The controller may operate to display the image that is output from the projector on the display plate.

The image may penetrate from a rear surface of the display plate and may be displayed on a front surface of the display plate.

The housing may further include a plurality of mirrors, and the image that is output from the projector may be reflected through the plurality of mirrors and may penetrate to a rear surface of the display plate.

The air conditioner according to the aspect of the present disclosure may further include a plurality of side openings, wherein the image is output to a periphery of the air conditioner through the side openings.

According to another aspect of the present disclosure, a method for controlling an air conditioner includes supplying a power to the air conditioner to correspond to a selection of a power button that is located on a housing; receiving a selection of an image external output button that is located on the housing to output an image that is output from a projector that is located inside the air conditioner to an outside; and reflecting the image that is output from the projector through a plurality of mirrors that are located inside the air conditioner to correspond to the selection of the image external output button, and outputting the reflected image to the outside through side openings that are formed on a side surface of the air conditioner.

The method according to the aspect of the present disclosure may further include receiving a selection of an operation mode button for selecting an operation mode of the air conditioner, wherein the image that is output from the projector penetrates a display plate that is exposed to a front surface of the air conditioner or is output to the outside through the side openings of the air conditioner to correspond to the selection of the operation mode button and the selection of the image external output button.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
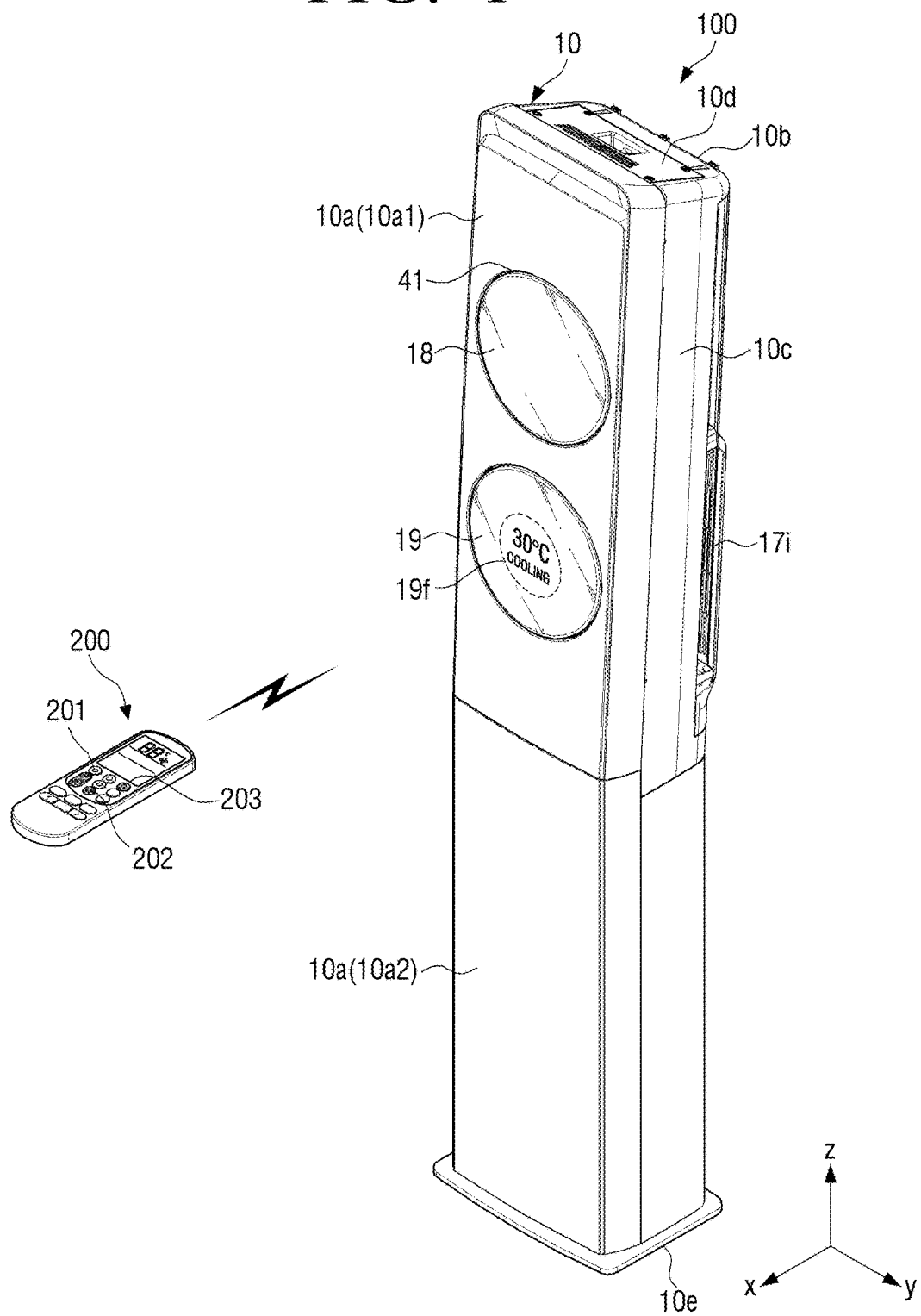
FIG. 1 is a schematic perspective view illustrating an air conditioner according to an embodiment of the present disclosure.

Hereinafter, exemplary embodiments of the present disclosure will be described with reference to the contents described in the accompanying drawings. However, it should be understood that the present disclosure is not limited to the specific embodiments described hereinafter, but includes various modifications, equivalents, and/or alternatives of the embodiments of the present disclosure. In relation to explanation of the drawings, the same drawing reference numerals may be used for the same components or constituent elements that perform substantially the same functions.

In the description, the terms "first, second, and so forth" are used to describe various elements regardless of their order or importance and to discriminate one element from other elements, but are not limited to the corresponding elements. For example, a first element and a second element may indicate different elements regardless of their order or importance. For example, without departing from the scope of the present disclosure, the first element may be called the second element, and the second element may be called the first element in a similar manner. The term "and/or" may include all possible combinations of items that are enumerated together.

In embodiments of the present disclosure, a "remote controller" may mean a device that can remotely control an air conditioner. For example, a remote controller of an air conditioner may include a dedicated remote controller that is used for an air conditioner of the same model (or model group), a general remote controller that can be used for an air conditioner of the same manufacturer or a different manufacturer, and/or a portable device (e.g., a portable phone, a smart phone, a PC, a notebook PC, a tablet, and/or a phablet that can install an application (hereinafter referred to as "app") that can download and install an app for controlling the air conditioner.

In embodiments of the present disclosure, "function (or operation mode) of an air conditioner" may include cooling, dehumidifying, air blowing, and heating, but is not limited thereto. In embodiments of the present disclosure, "operation of an air conditioner" may mean performing of the function (e.g., cooling, dehumidifying, air blowing, or heating) of an air conditioner by a user (or pre-stored setting). Further, in embodiments of the present disclosure, "status of an air conditioner" may mean text, image or symbol that indicates internal temperature of an air conditioner, external temperature, wind direction, wind strength, or operation mode, which corresponds to the operating air conditioner.

The terms used in the description are used to merely describe a specific embodiment, but may not intend to limit the scope of other embodiments. In the description, a singular expression may include a plural expression unless specially described. The term "includes" or "has" used in the description represents that features, figures, steps, operations, constituent elements, components, or combinations thereof exist, and thus the term should be understood that existence or addition of one or more other features, figures, steps, operations, constituent elements, components, or combinations thereof are not pre-excluded. In the drawings, the same reference numerals indicate members that perform substantially the same functions.

Figure 2:
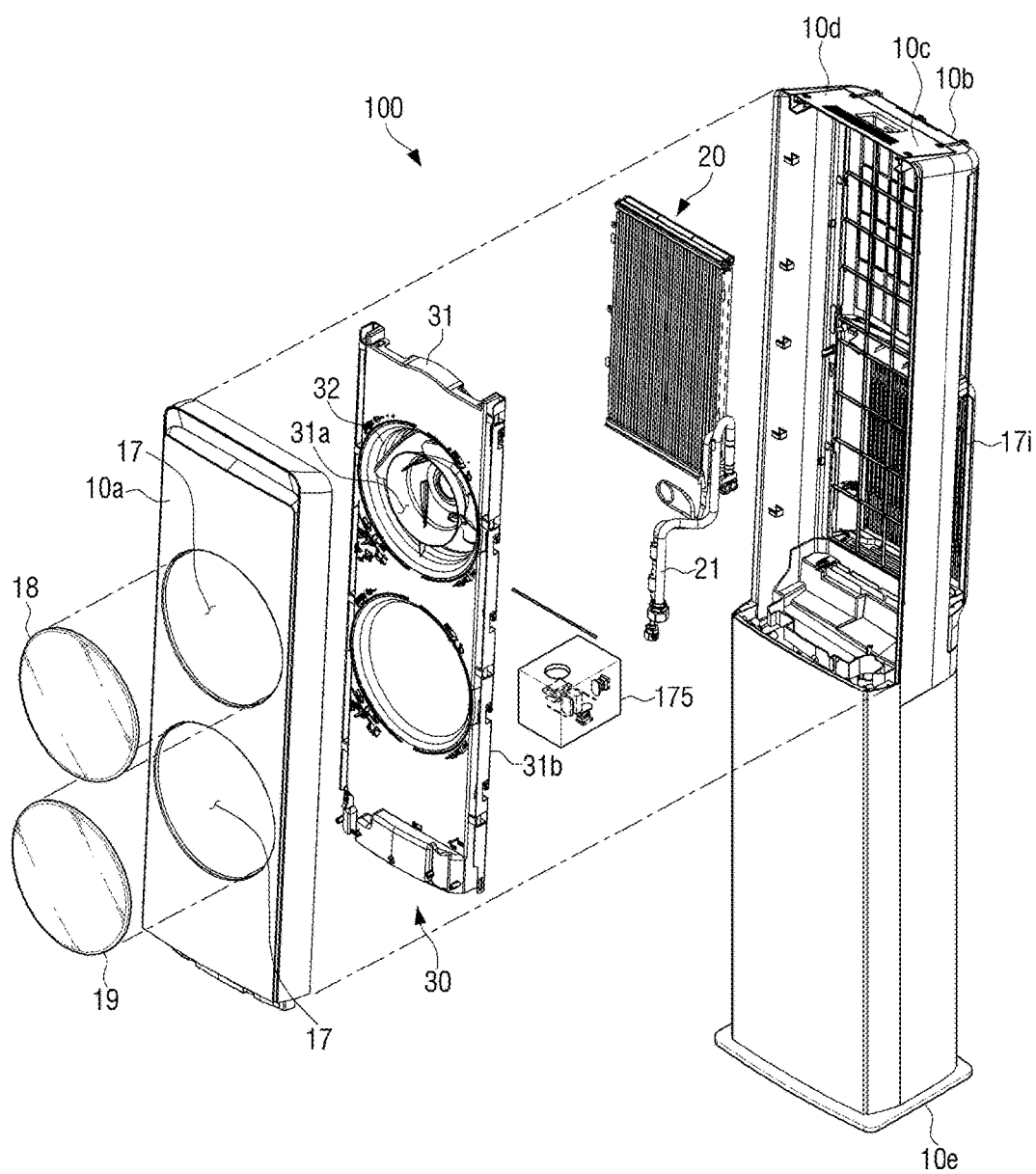
FIG. 2 is a schematic exploded perspective view illustrating an air conditioner according to an embodiment of the present disclosure.

FIG. 1 is a schematic perspective view illustrating an air conditioner according to an embodiment of the present disclosure, and FIG. 2 is a schematic exploded perspective view illustrating an air conditioner according to an embodiment of the present disclosure.

Referring to FIGS. 1 and 2, an air conditioner 100 may include an indoor unit (hereinafter referred to as "air conditioner") 100 and an outdoor unit (not illustrated).

The air conditioner 100 may include a housing 10 having one or more openings 17 and forming an external appearance of the air conditioner, a heat exchanger 20 that performs heat exchange with air that flows into the housing 10, a blower 30 that circulates air inside or outside the housing 10, and a discharge port 41 that discharges the air that is blown from the blower 30 to an outside of the housing 10.

The housing 10 may include a front housing 10a having one or more (e.g., 2, 3, 4, or more) openings 17 formed thereon, a rear housing 10b that is located in the rear (e.g., −x-axis direction) of the front housing 10a, a side housing 10c that is located between the front housing 10a and the rear housing 10b (e.g., +/−y-axis direction), an upper housing 10d that is located on an upper portion (e.g., +z-axis direction) of the side housing 10c, and a lower housing 10e that is located on a lower portion (e.g., −z-axis direction) of the side housing 10c.

One front housing 10a or a plurality of front housings 10a1 and 10a2 may be implemented.

The front housing 10a, the rear housing 10b, the side housing 10c, the upper housing 10d, and the lower housing 10e as described above may be named on the basis of the front housing 10a. The respective housings 10a to 10e may be separated from each other, or parts thereof 10b, 10d, and 10e, or 10b, 10c, 10d, and 10e, which can be changed in accordance with the function and/or the structure of the air conditioner, may be integrally formed in a body.

One or more openings 17 may be formed to be spaced apart from each other in upper/lower direction (e.g., +/−z- axis direction). Two or more openings 17 may be formed on the front housing 10*a* to be spaced apart from each other.

The shape of one or more openings 17 may be a circle, an ellipse, a polygon, or a free-form in which polygonal corners are rounded. The two or more openings 17 may have different shapes (e.g., the first opening is circular, and the second opening is elliptical).

An opening 17*j* (see FIG. 7) that is a path of an image that is output from the interior of the housing 10 may be formed on one side (e.g., one of left and right sides on the basis of the front surface of the air conditioner 100) or on both sides (e.g., left and right sides on the basis of the front surface of the air conditioner 100) of the side housing 10*c*.

A suction port 17*i* that is a path for guiding air that is sucked into the housing 10 may be formed over the rear housing 10*b*, the side housing 10*c*, or the rear housing 10*b* and the side housing 10*c*. The suction port 17*i* may be located in the rear of the heat exchanger 20 that is inside the housing 10.

The sucked air that passes through the heat exchanger 20 that corresponds to the evaporator of the refrigeration cycle may be cooled or heated. The air that has passed through the heat exchanger 20 may be discharged to the outside through the discharge port 41 by the blower 30. The heat exchanger 20 may be fixed to the interior of the housing 10 by a fixing device (not illustrated) that is provided inside the housing 10.

A drain hose 21 for draining water that is generated in the heat exchanger 20 and a refrigerant pipe (not illustrated) for connecting the heat exchanger 20 that is inside the housing 10 to an outdoor heat exchanger (not illustrated) are connected to one end of the heat exchanger 20.

The blower 30 may include a fan 32 and a grill (not illustrated). The fan 32 may discharge the heat-exchanged air to the outside. The fan 32 may include a mixed flow fan, an axial fan, or a centrifugal fan, but is not limited thereto. In an embodiment of the present disclosure, the number of fans 32 may be equal to the number of openings 17. For example, if the number of fans 32 is two, the number of openings 17 may be two.

The grill (not illustrated) may be located in a blowing direction (e.g., +y-axis direction) of the fan 32.

The blower 30 may further include a duct 31. The duct 31 may surround the fan 32 and may include one or plural openings 31*a* for guiding the air that flows to the fan 32. Further, the duct 31 may further include an opening 32*b* that corresponds to the display plate 19.

A motor (not illustrated) for driving the fan 32 may be located in an axis direction (e.g., +y-axis direction) of the fan 32.

The discharge port 41 discharges the heat-exchanged air to the outside. In an embodiment of the present disclosure, the discharge port 41 may be exposed by a door plate 18. The discharge port 41 may be exposed by a door plate driver (not illustrated) that moves (protrudes) the door plate 18 in the blowing direction. The heat-exchanged air may be discharged to the outside through the discharge port 41 between the moved door plate 18 and the opening 17.

In another embodiment of the present disclosure, the discharge port 41 may be implemented to be larger than the diameter of the door plate 18 and to be smaller than the diameter of the opening 17. The heat-exchanged air may be discharged to the outside through the discharge port 41 that is larger than the diameter of the door plate 18 and is smaller than the diameter of the opening 17.

The shape of the door plate 18 may be a circle, an ellipse, a polygon, or a free-form in which polygonal corners are rounded.

Figure 5:
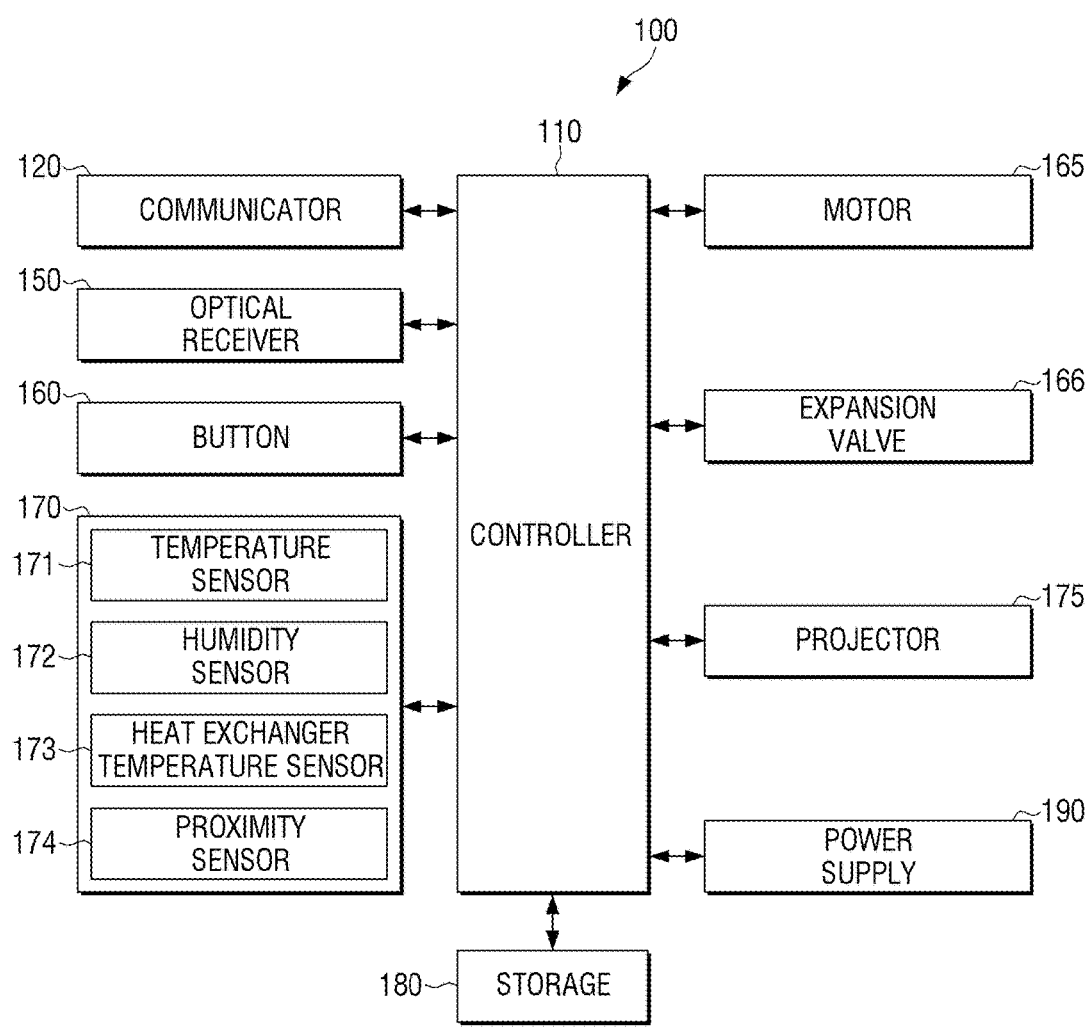
FIG. 5 is a schematic block diagram illustrating the configuration of an air conditioner according to an embodiment of the present disclosure.

The display plate 19 may be an image 19*f* that corresponds to the operation and/or the state of the air conditioner 100 under the control of the controller 100 (see FIG. 5).

The shape of the display plate 19 may be a circle, an ellipse, a polygon, or a free-form in which polygonal corners are rounded. Further, the shape of the door plate 18 may be different from the shape of the display plate 19 (e.g., the shape of the door plate 18 is a circle, and the shape of the display plate 19 is a free-form).

It is sufficient that the material of the display plate 19 is a material through which the image 19*f* penetrates well. For example, the image 19*f* penetrates from the rear surface of the display plate 19 (e.g., the interior of the air conditioner 100) and is displayed on the front surface of the display plate 19 (e.g., the outside of the air conditioner 100).

The material of the display plate 19 may include cork, dark wood, fabric, or black solid. Further, the material of the display plate 19 may include plastic or resin through which the image 19*f* can penetrate well.

It may be sufficient that the color of the display plate 19 is a color that can be well discriminated from the color of the penetrating image 19*f*. For example, the color of the display plate 19 may be the same as or may be different from the color of the surface of the air conditioner 100. Further, it may be sufficient that the color of the display plate 19 is well discriminated from the color of the image 19*f* that penetrates to correspond to the material of the display plate 19.

A remote controller 200 may output a control signal that corresponds to a user input (e.g., button selection, touch, touch gesture, voice, or motion) to the air conditioner 100. The remote controller 200 may include a power button 201 for supplying a power to the air conditioner 100 and an image external output button 202 for outputting the image to the outside of the air conditioner 100.

The remote controller 200 may output the control signal that corresponds to the user input (e.g., button selection, touch, voice, or motion) to the air conditioner 100 using at least one of an optical outputter (not illustrated) and a communicator (not illustrated).

Figure 3:
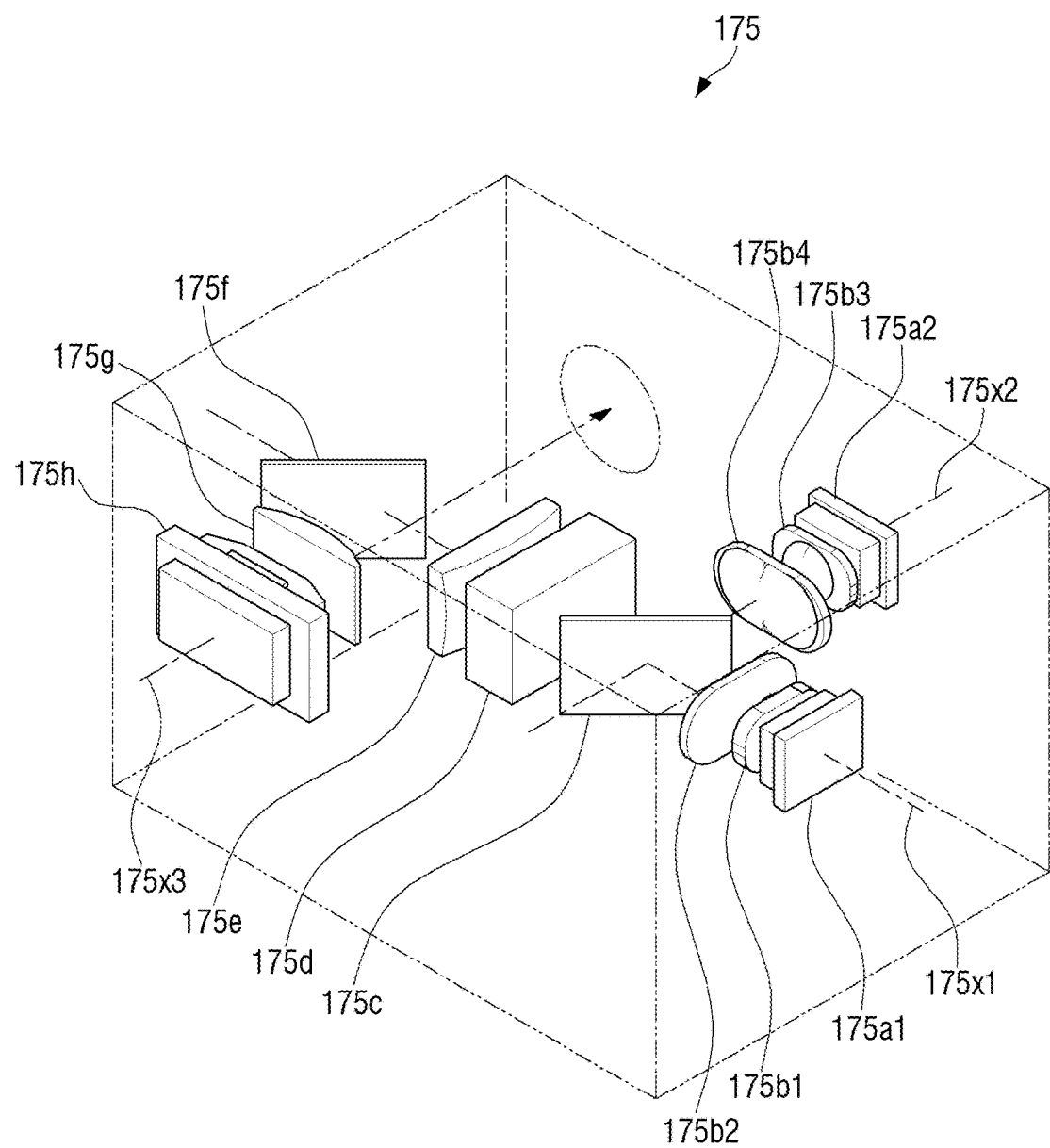
FIG. 3 is a schematic perspective view illustrating a projector of an air conditioner according to an embodiment of the present disclosure.

FIG. 3 is a schematic perspective view illustrating a projector of an air conditioner according to an embodiment of the present disclosure.

A projector 175 may output an image (e.g., that is implemented by a text, an image, a symbol, or a moving image) that is displayed on the display plate 19 to correspond to the operation state of the air conditioner 100. The projector 175 may output an image (e.g., that is implemented by a text, an image, a symbol, or a moving image) that is displayed on the display plate 19.

The projector 175 may include a DLP (Digital Light Processing) projection type using a DMD (Digital Micromirror Device) and an LCD projection type that forms an image using one or plural LCDs. The above-described DLP projection type and the LCD projection type are well known in the art, but it can be easily understood by those of ordinary skill in the art that the projection types can be changed in accordance with the size and/or structure of the air conditioner 100 that corresponds to an embodiment of the present disclosure.

The DLP projection type projector 175 may include an illumination optical system 175*a* to 175*g*, a DMD (Digital Micro-mirror Device) 175*h*, a projection optical system (not illustrated), and a reflector (not illustrated).

The illumination optical system includes a first auxiliary optical axis 175x1, a second auxiliary optical axis 175x2, a first light source 175a1, a second light source 175a2, first to fourth collimating lenses 175b1, 175b2, 175b3, and 175b4, a filter 175c, an equalization lens 175d, a condensing lens 175e, and a first mirror 175f. The second light source 175a2, the third collimating lens 175b3, and the fourth collimating lens 175b4 are aligned on the second auxiliary optical axis 175x1.

In an embodiment of the present disclosure, the plurality of light sources 175a1 and 175a2 are exemplary, and one light source (e.g., wavelength variable light source) that outputs various color lights or three light sources according to three primary colors may be used.

The first light source 175a1 may be implemented by a first light (e.g., LED that outputs green light) that propagates along the first auxiliary optical axis 175x1.

The first and second collimating lenses 175b1 and 175b2 receives and collimates (i.e., parallelizes) the first light that is output from the first light source 175a1 to output the collimated light. In an embodiment of the present disclosure, one collimating lens may be implemented.

The second light source 175a2 may be implemented by one or two LEDs that outputs a second light (e.g., red light) and/or a third light (e.g., blue light) that propagate along the auxiliary optical axis 175x2.

The third and fourth collimating lenses 175b3 and 175b4 receives and collimates the second light and/or the third light that are emitted from the second light source 175a2. In an embodiment of the present disclosure, a third light source (not illustrated) that is separate from the second light source 175a2 may be implemented, and separate collimating lenses (not illustrated) may be located in front of the respective light sources.

The filter 175c reflects the second light and the third light that are input from the fourth collimating lens 175b4 to make the reflected lights propagate along the first auxiliary optical axis 175x1. Further, the filter 175c is penetrated by the first light that is input from the second collimating lens 175b2.

The filter 270 may be arranged at an angle of 45° against the first auxiliary optical axis 175x1 to reflect the second light and/or third light at an angle of 90°. In an embodiment of the present disclosure, the angle between the filter 175c and the first auxiliary optical axis 175x1 (e.g., 45°) is exemplary, and is not limited thereto. The first to third lights that are incident by the filter 175c may propagate along the first auxiliary optical axis 175x1.

The equalization lens 175d makes the light that is incident from the filter 175c uniform (e.g., uniform in distribution of the light intensity).

The condensing lens 175e may condense the light that is output from the equalization lens 175d.

The first mirror 175f reflects the condensed light that is output from the condensing lens 175e to the direction of a display device 300.

The DMD 175h may form the image through reflection of the light that is incident from the illumination optical system in the unit of a pixel. The DMD 175h may include a DMD chip that includes micro-mirrors that are arranged by M×N (e.g., 1280×720) that correspond to the resolution. The DMD 175h may further include a driving circuit (not illustrated) that outputs a driving signal for driving the DMD chip. The driving circuit (not illustrated) may be driven under the control of the controller 110.

The light (e.g., corresponding to the image) that is reflected from the DMD 175h may be output to the outside through a field lens 175g that is a part of the projection optical system.

The projection optical system may include the field lens 175g and a projection lens (not illustrated) that are aligned along the optical axis 175x3. The projection lens (not illustrated) may adjust a focal point of the light (or image) that is displayed on the display plate 19, and may enlarge the light (or image) that is output from the DMD to correspond to the size of the display plate 19.

The above-described DLP projection type projector 175 is exemplary, and it can be easily understood by those of ordinary skill in the art to which the present disclosure pertains that the structure and/or the arrangement of the projector 175 may be changed to correspond to the LCD projection type projector that is different from the DLP projection type projector.

In an embodiment of the present disclosure, if the optical axis 175x3 of the light that is output from the projector 175 and the center 19a of the display plate 19 are non-coaxial, it is required to provide a separate optical member between the projector 175 and the display plate 19. The optical member (e.g., mirror) may be located inside the housing 10, and may be fixed to one of the interior of the rear housing 10b and the interior of the side housing 10c to correspond to image forming of the display plate 19.

In an embodiment of the present disclosure, if the optical axis 175x3 of the light that is output from the projector 175 and the center 19a of the display plate 19 are coaxial, it may not be required to provide a separate optical member (e.g., second mirror) between the projector 175 and the display plate 19.

Figure 4A:
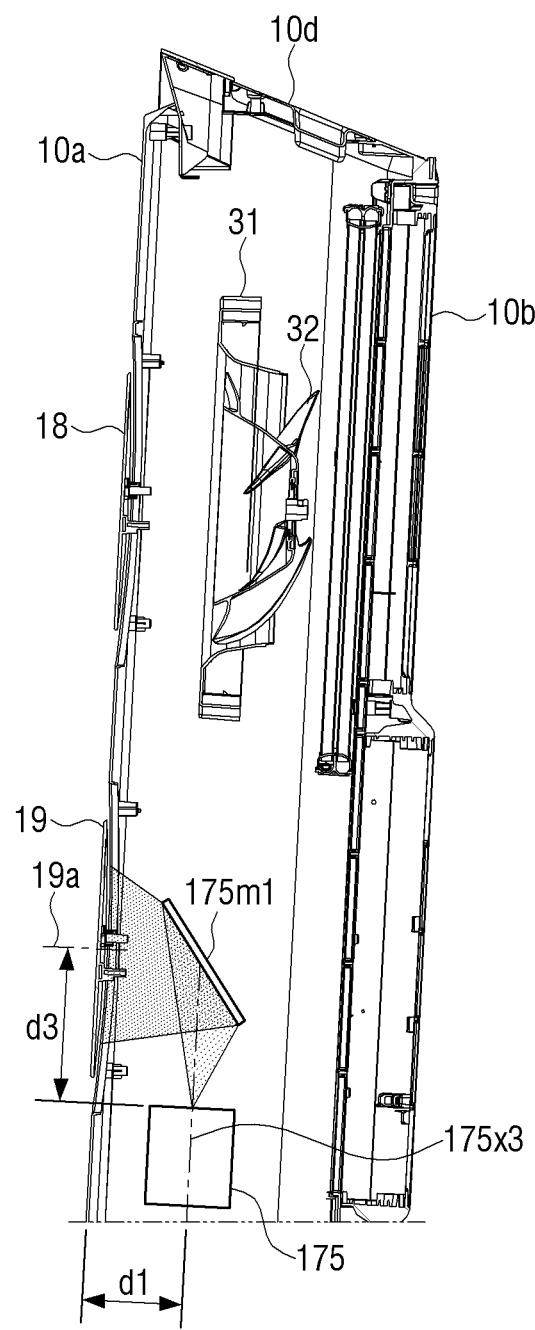
FIGS. 4A and 4B are schematic cross-sectional views illustrating the location of a projector of an air conditioner according to an embodiment of the present disclosure.
Figure 4B:
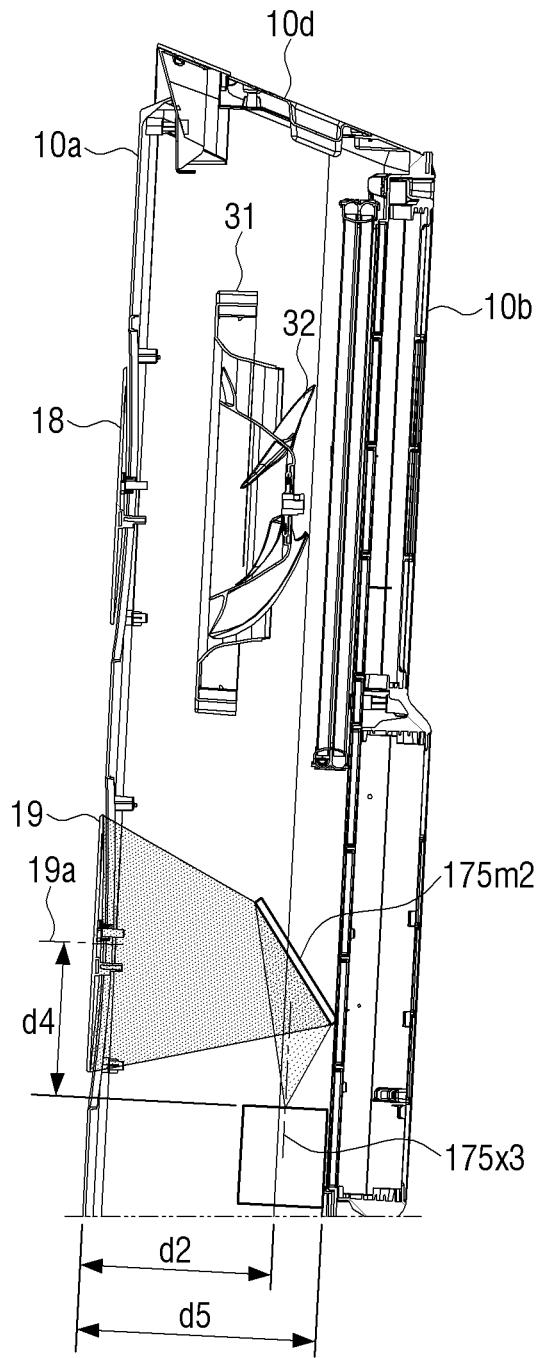

FIGS. 4A and 4B are schematic cross-sectional views illustrating the location of a projector of an air conditioner according to an embodiment of the present disclosure.

Referring to FIGS. 4A and 4B, the optical axis 175x3 of the light that is output from the projector 175 and the center of the display plate 19 are non-coaxial, and thus separate second mirrors 175m1 and 175m2 are required.

In FIGS. 4A and 4B, if the sizes (or areas) of the display plates 19 are equal to each other, the size of an image that is displayed on the display plate 19 may differ depending on the distance between the display plate 19 and the optical axis 175x3 of the projector 175. For example, if the distance between the display plate 19 and the optical axis 175x3 of the projector 175 is far (d2>d1), the image that is displayed on the display plate 19 may have a larger size.

If the sizes (or areas) of the display plates 19 are equal to each other, the size of the image that is displayed on the display plate 19 may differ depending on the distance d3 between the center 19a of the display plate 19 and the projector 175. For example, if the distance d3 between the center 19a of the display plate 19 and the projector 175 is increased, the size of the image that is displayed on the display plate 19 may become larger. Further, if the distance d4 between the center 19a of the display plate 19 and the projector 175 is increased, the size of the image that is displayed on the display plate 19 may become larger.

If the distance d3 between the center 19a of the display plate 19 and the projector 175 is increased, the size of the second mirror 175m1 (e.g., width×length, or diameter) may become larger. Further, if the distance d4 between the center 19a of the display plate 19 and the projector 175 is increased, the size of the second mirror 175m2 (e.g., width×length, or diameter) may become larger.

The distance d2 or d1 between the display plate 19 and the optical axis 175x3 of the projector 175 is smaller than the width of the air conditioner 100. Further, the distance d5 between the display plate 19 and the second mirror 175m2 may be smaller than the width of the air conditioner 100.

The location of the projector 175 as described above is not limited to that as illustrated in FIGS. 4A and 4B. For example, if the location of the projector 175 is changed, the size of the image that is displayed on the display plate 19 may be changed. If the location of the projector 175 is changed, the size and/or the location of the separate optical member 175m1 or 175m2 may be changed.

Referring to FIGS. 4A and 4B, the light that is output from the projector 175 to correspond to the image forming is not restricted (or interfered) by a separate constituent element (e.g., obstacle) in the optical path up to the display plate 19. The interior of the air conditioner 100 may provide a space that corresponds to the projector 175, the optical member 175m1 or 175m2, and the optical path.

FIG. 5 is a schematic block diagram illustrating the configuration of an air conditioner according to an embodiment of the present disclosure.

Referring to FIG. 5, an air conditioner 100 may be functionally connected to another electronic device (e.g., a portable device (not illustrated), such as a smart phone) through one of a communicator 120 and an optical receiver 150. Further, the air conditioner 100 may be functionally connected to a remote controller 200 through the optical receiver 150. The remote controller 200 may include at least one of an optical outputter (not illustrated) that corresponds to the optical receiver 150 and a communicator (not illustrated) that corresponds to the communicator 120 of the air conditioner 100.

The air conditioner 100 may include a controller 110, the communicator 120, the optical receiver 150, buttons 160, sensors 170, a motor 165, an expansion valve 166, a storage 180, and a power supply 190. Further, the air conditioner 100 may further include a projector 175 that outputs an image.

The controller 110 may include a processor (not illustrated). Further, the controller 110 may further include a ROM (not illustrated) in which a control program for controlling the air conditioner 100 is stored and a RAM (not illustrated) that is used as a storage region for various tasks that are performed in the air conditioner 100. The ROM and/or the RAM may be implemented by a flash memory.

The controller 110 controls the overall operation of the air conditioner 100 and a signal flow between internal constituent elements 120 to 190 of the air conditioner 100, and processes data. The controller 110 controls power supply to the internal constituent elements 120 to 190 using the power supply 190.

The controller 110 may control the communicator 120, the optical receiver 150, the buttons 160, the sensors 170, the motor 165, the expansion valve 166, the projector 175, the storage 180, and the power supply 190. Further, the air conditioner 100 may further include the projector 175 that outputs the image.

In an embodiment of the present disclosure, the term "the controller of the air conditioner" may include the processor and may further include at least one of the ROM and the RAM.

The communicator 120 may be connected to another electronic device (e.g., a portable device (not illustrated), such as a smart phone, or a server (not illustrated)) through a wireless LAN communicator (not illustrated) and/or a near field communicator (not illustrated) using one or more antennas.

The wireless LAN communicator (not illustrated) may be wirelessly connected to an AP (Access Point) in a place where the AP is installed under the control of the controller 110. The wireless LAN communicator (not illustrated) may support, for example, Wi-Fi communications.

The near field communication may include Bluetooth communication, Bluetooth low energy communication, UWB (Ultra-WideBand) communication, and/or NFC communication.

Further, the air conditioner 100 may include a USB input jack (not illustrated). If a communication dongle (not illustrated) is connected to the USB input jack (not illustrated) of the air conditioner 100, another electronic device (e.g., a portable device (not illustrated), such as a smart phone) may remotely control the air conditioner 100.

The optical receiver 150 receives an optical signal (e.g., including control information) that is output from the remote controller (not illustrated) through a light window (not illustrated).

The optical receiver 150 may receive an optical signal that corresponds to a user input (e.g., touch, press, touch gesture, voice, or motion) corresponding to the functions (e.g., cooling and dehumidifying) of the air conditioner 100 from the remote controller (not illustrated). The control information may be extracted from the received optical signal. The received optical signal and/or the extracted control information may be transmitted to the controller 110.

One or plural buttons 160 may be located on the front housing 10a of the air conditioner 100. For example, the buttons may include a power button, buttons for operation modes (e.gt., a wind speed mode including high, middle, and low speeds, an automatic mode, a manual mode, a dehumidifying mode, a cooling mode, a blowing mode, an air purifying mode, and a heating mode), an image external output button, one or plural temperature adjustment buttons, and wind amount button. Further, the one or plural buttons 160 may be located on the side housing 10c of the air conditioner 100.

The motor 165 drives a fan 32 under the control of the controller 110. The motor 165 may control the rotating speed of the fan 32. The number of motors 165 may correspond to the number of fans 32.

The expansion valve 166 may adjust the amount of refrigerant that is supplied to the heat exchanger 20 under the control of the controller 110. Further, the expansion valve 166 may adjust the amount of refrigerant that is supplied to the heat exchanger 20 corresponding to the operation mode of the air conditioner 100 under the control of the controller 110.

The sensors 170 may detect the state of the air conditioner 100 and/or the peripheral state of the air conditioner 100. The sensors 170 may include a temperature sensor 171 for detecting an external temperature of the air conditioner 100 and/or internal/external temperature of the air conditioner 100, a humidity sensor 172 for detecting external humidity of the air conditioner, a heat exchanger temperature sensor 173 for detecting the temperature of the heat exchanger 20 that performs heat exchange with the sucked air, and a proximity sensor 174 for detecting user's approach to the air conditioner 100. Further, the sensors 170 may further include a gas sensor (not illustrated) or a particulate matter sensor (not illustrated) in relation to the air purifying function.

It can be easily understood by those of ordinary skill in the art to which the present disclosure pertains that the sensors 170 may be added, changed, or deleted in accordance with the performance of the air conditioner 100.

The projector 175 outputs an image that is displayed on the display plate 19 under the control of the controller 110. The projector 175 may output the image that is displayed on the display plate 19 to correspond to the operation (or operation mode) of the air conditioner 100 under the control of the controller 110. Further, the projector 175 may output the image that is displayed on the display plate 19 to correspond to the state of the air conditioner 100 under the control of the controller 110.

Since the detailed contents thereof have been described with reference to FIGS. 3 to 4B, duplicate description thereof will be omitted.

The storage 180 may store therein various kinds of data, programs, or applications for driving and controlling the air conditioner 100 under the control of the controller 110. The storage 180 may store therein signals or data that are input/output to correspond to the driving of the communicator 120, the optical receiver 150, the buttons 160, the sensors 170, the motor 165, the expansion valve 166, the projector 175, the storage 180, and the power supply 190.

The storage 180 may store therein a control program for control of the air conditioner 100 and the controller 110, an application that is initially provided by a manufacturer or is downloaded from the outside, a GUI (Graphic User Interface) that corresponds to the application, objects (e.g., image texts, icons, buttons) for providing the GUI, user information, databases, and related data.

The storage 180 may include an operation mode control module, a communication control module, an optical receiving module, a projector control module, an audio control module, a button control module, a power control module, or a motion DB (DataBase), which are not illustrated.

In the storage 180, the modules and the database (not illustrated) may be implemented by software to perform an operation mode function, a communication control function, an optical receiving function, a projector function, an audio function, a button function, and a power control function in the air conditioner 100.

The controller 110 may perform the function of the air conditioner 100 using the above-described software stored in the storage 180.

The power supply 190 supplies a power that is input from an external power source to the internal constituent elements 110 to 190 of the air conditioner 100 under the control of the controller 110.

At least one of the constituent elements (e.g., 110 to 190) of the air conditioner 100 as illustrated in FIGS. 1 and 2 may be added, changed, or deleted to correspond to the performance and/or the kind of the air conditioner 100. Further, it will be understood by those of ordinary skill in the art to which the present disclosure pertains that locations of the constituent elements (e.g., 110 to 190) can be changed to correspond to the performance or structure of the air conditioner 100.

Figure 6:
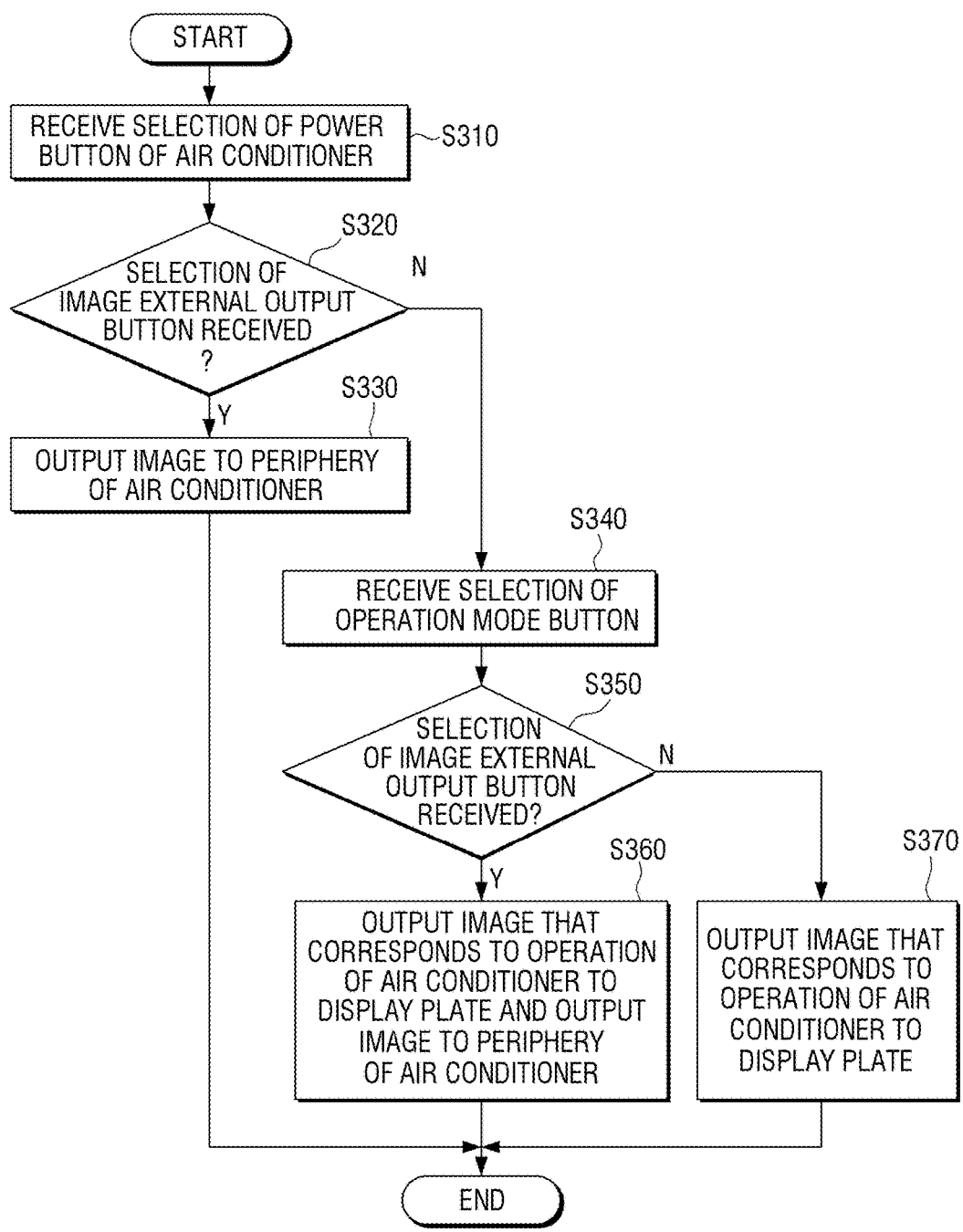
FIG. 6 is a schematic flowchart illustrating a method for controlling an air conditioner according to an embodiment of the present disclosure.
Figure 7:
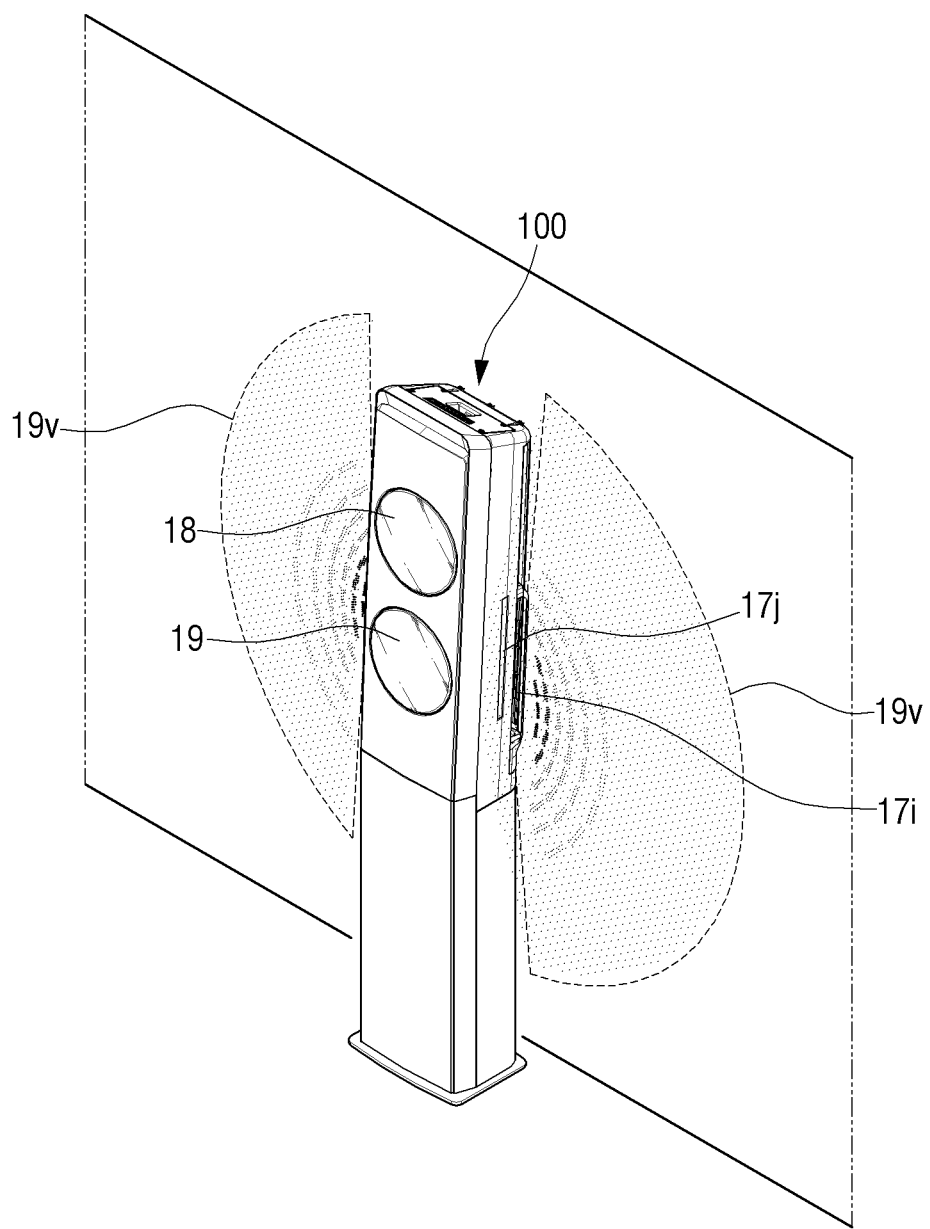
FIG. 7 is a view illustrating an example of a method for controlling an air conditioner according to an embodiment of the present disclosure.
Figure 8:
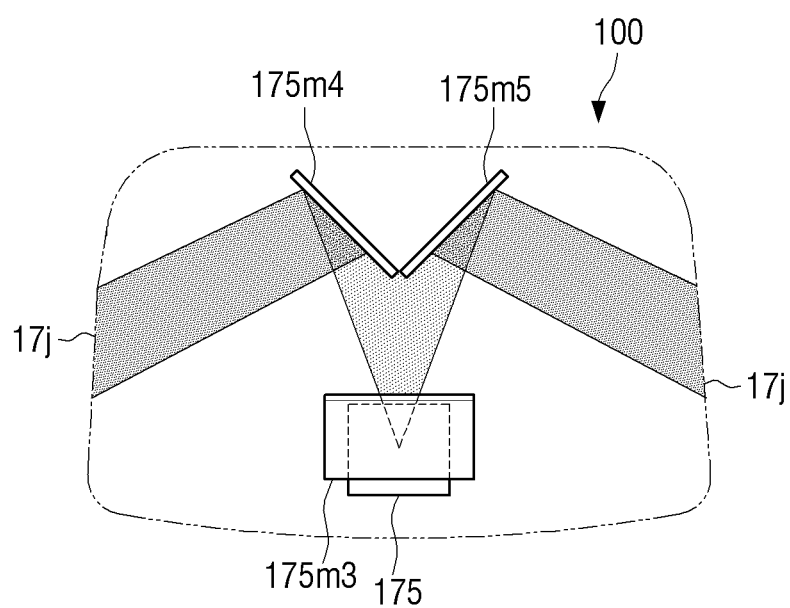
FIG. 8 is a schematic cross-sectional view illustrating optical paths in a projector of an air conditioner according to an embodiment of the present disclosure.

FIG. 6 is a schematic flowchart illustrating a method for controlling an air conditioner according to an embodiment of the present disclosure. FIG. 7 is a view illustrating an example of a method for controlling an air conditioner according to an embodiment of the present disclosure, and FIG. 8 is a schematic cross-sectional view illustrating optical paths in a projector of an air conditioner according to an embodiment of the present disclosure.

At operation S310 of FIG. 6, a selection of a power button of an air conditioner is received.

The air conditioner 100 may receive a control signal that corresponds to user's selection of the power button (not illustrated) among the buttons 160 and user's selection of the power button 201 of the remote controller 200 through the optical receiver 150. Further, the air conditioner 100 may receive a control signal that corresponds to user's selection of the power button 201 of the remote controller 200 through the communicator 120.

The controller 110 of the air conditioner 100 may control the power supply 190 to supply the power to the air conditioner 110 to correspond to the selection of the power button (or reception of the control signal that corresponds to the selection of the power button).

The air conditioner 100 to which the power has been supplied by the controller 110 may be in a standby state (e.g., before the selection of the operation mode button) to perform a set operation (e.g., cooling). In an embodiment of the present disclosure, the air conditioner 100 to which the power has been supplied by the controller 110 may perform the set operation (e.g., cooling). At operation S320 of FIG. 6, reception of the image external output button selection is determined.

The controller 110 may determine the reception of the selection of the image external output button through reception of the control signal that corresponds to user's selection of the button 160 of the air conditioner 100 or user's selection of the button 202 of the remote controller 200.

The air conditioner 110 to which the power has been supplied may receive the selection of the image external output button (not illustrated) among the buttons 160 and the control signal that corresponds to the selection of the image external output button 202 of the remote controller 200 that is received through the optical receiver 150. Further, the air conditioner 100 may receive the control signal that is received through the communicator 120 to correspond to the selection of the image external output button 202 from the remote controller 200.

The controller 110 may store, in the storage 180, image external output button reception information that corresponds to the reception of the selection of the image external output button (not illustrated) and the reception of the control signal corresponding to the selection of the image external output button 202 from the remote controller 200. The image external output button reception information that is stored in the storage 180 may include a button name (e.g., image external output button), button location (e.g., air conditioner or remote controller), and signal reception time. The stored image external output button reception information may be used even for history management.

The image external output button reception information as described above is exemplary, and it is sufficient that the information is stored in the storage 180 to be used for the history management as a file that corresponds to the selection of the image external output button (not illustrated) and the reception of the control signal corresponding to the selection of the image external output button 202 from the remote controller 200.

At operation S320 of FIG. 6, if the selection of the image external output button is received, the process proceeds to operation S330. Further, at operation S320 of FIG. 6, if the selection of the image external output button is not received, the process proceeds to operation S340.

At operation S330 of FIG. 6, the image is output to the periphery of the air conditioner.

Figure 14:
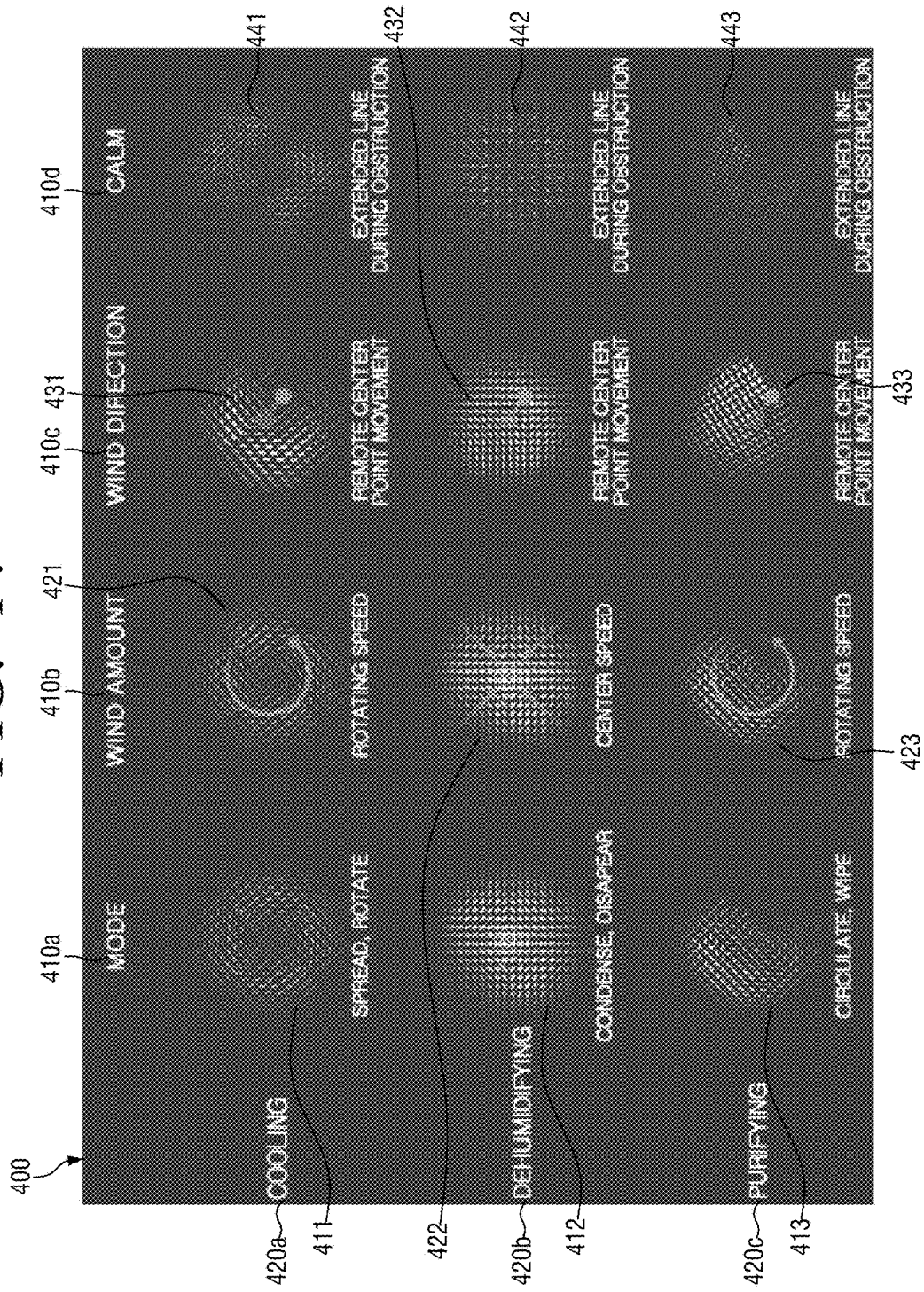
FIG. 14 is a diagram illustrating examples of images that are displayed on a display plate of an air conditioner according to embodiments of the present disclosure.

Referring to FIGS. 7, 8, and 14, the controller 110 may operate the projector 175 to correspond to the selection of the image external output button (or reception of the control signal that corresponds to the selection of the image external output button).

Under the control of the controller 110, light (or image) 19v that is output from the projector 175 may be initially reflected by a first mirror 175m3, may be reflected by second mirrors 175m4 and 175m5, respectively, and then may be output to the outside through the opening 17j that is formed on the side housing 10c of the air conditioner 100. Further, under the control of the controller 110, a part or the whole of the light (or image) 19v that is output from the projector 175 may be initially reflected by the first mirror 175m3, may be reflected by the second mirrors 175m4 and 175m5, respectively, and then may be output to the outside through the opening 17j that is formed on the side housing 10c of the air conditioner 100.

The locations, sizes, and/or angles of the second mirrors 175m4 and 175m5 (e.g., the angle between the second mirrors 175m4 and 175m5, the angle between the second mirror 175m4 and the side housing 10c, and the angle between the second mirror 175m5 and the side housing 10c) may be changed to correspond to the location and/or the size (e.g., width×length) of the opening 17j that is formed on the side housing 10c.

In an embodiment of the present disclosure, the second mirrors 175m4 and 175m5 may be located adjacent to the display plate 19 (e.g., in the rear of the display plate 19 or on the side surface of the display plate 19. Further, in an embodiment of the present disclosure, if the second mirrors 175m4 and 175m5 are located in the rear of the display plate 19, the air conditioner 100 may further include a separate display (e.g., LCD, not illustrated) in addition to the display plate 19, and an image (e.g., 191) that corresponds to the operation and/or the state of the air conditioner 100 may be displayed on the separate display (not illustrated).

The distances and/or the angles between the first mirror 175m3 and the second mirrors 175m4 and 175m5 (e.g., the angle between the first mirror 175m3 and the second mirror, the angle between the second mirror 175m4 and the side housing 10c, and the angle between the second mirror 175m5 and the side housing 10c) may be changed to correspond to the location and/or the size (e.g., width× length) of the opening 17j that is formed on the side housing 10c.

The controller 110 may operate to output the image 19v only to both sides of the outside of the air conditioner 100 using the projector 175 and the mirrors 175m3 to 175m5 to correspond to the selection of the image external output button (or reception of the control signal that corresponds to the selection of the image external output button). Further, the controller 110 may operate to output the image 19v only to one side of the outside of the air conditioner 100 using the projector 175 and the mirrors 175m3 and 175m4, or 175m3 and 175m5 to correspond to the selection of the image external output button (or reception of the control signal that corresponds to the selection of the image external output button).

In an embodiment of the present disclosure, the controller 110 may control the projector 175 not to output the image 19f that corresponds to the operation (or the state) of the air conditioner 100 to the display plate 19 to correspond to the selection of the image external output button (or reception of the control signal that corresponds to the selection of the image external output button).

At operation S330 of FIG. 6, if the image is output to the periphery of the air conditioner, the method for controlling the air conditioner is ended.

Figure 9:
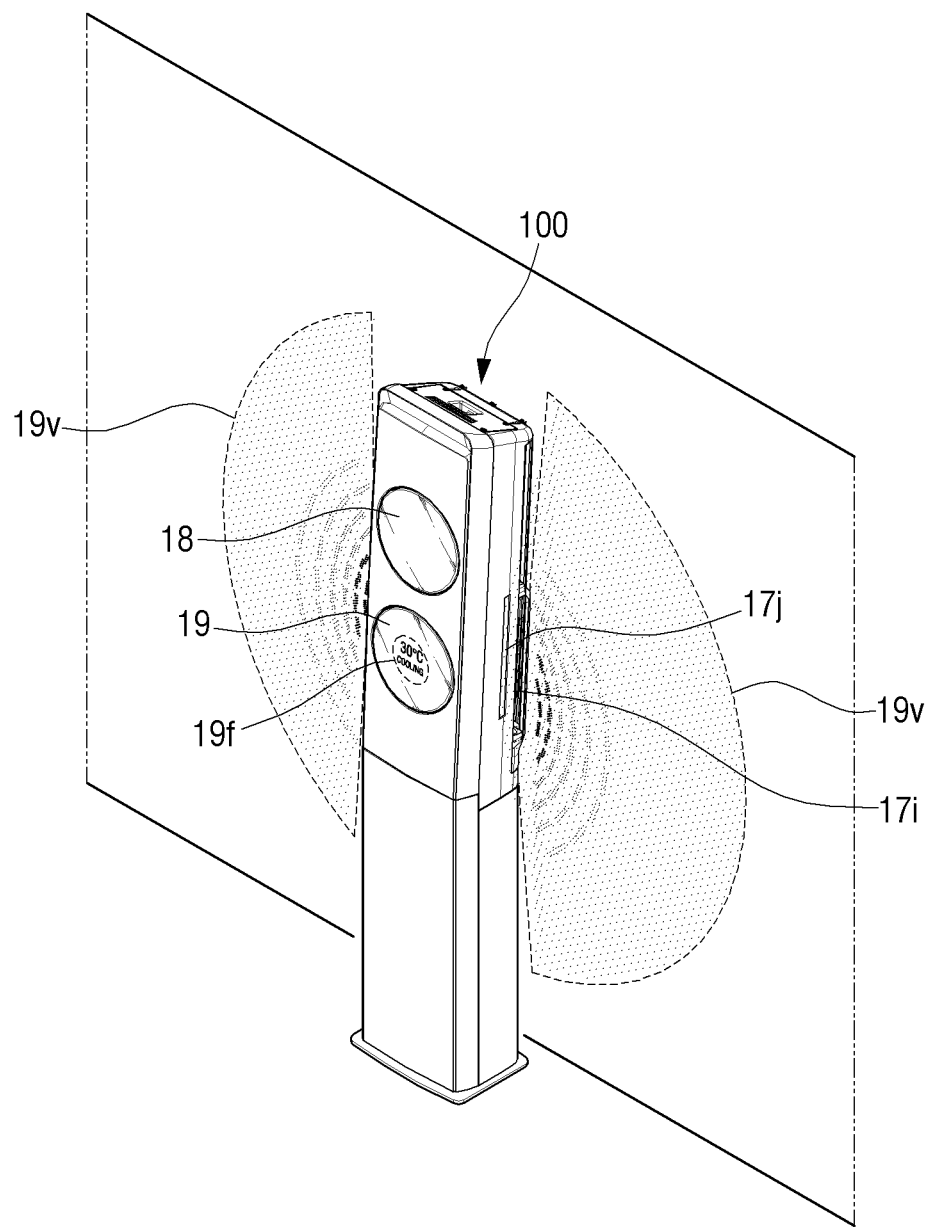
FIG. 9 is a view illustrating an example of a method for controlling an air conditioner according to another embodiment of the present disclosure.
Figure 10:
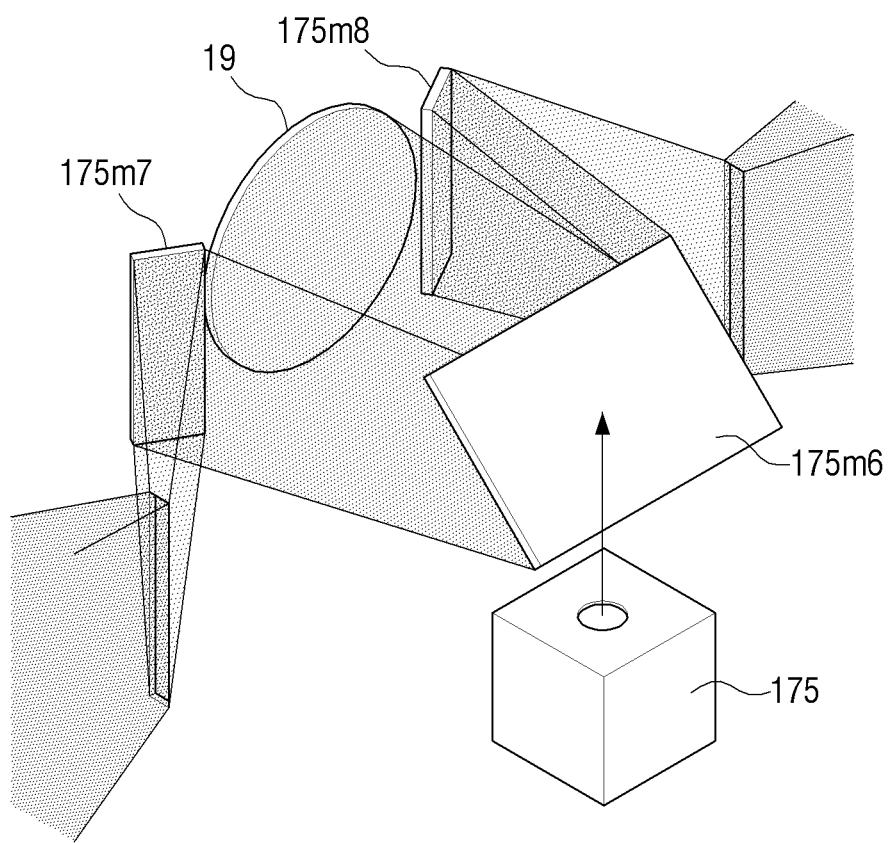
FIGS. 10 and 11 are schematic cross-sectional views illustrating optical paths in a projector of an air conditioner according to another embodiment of the present disclosure.
Figure 11:
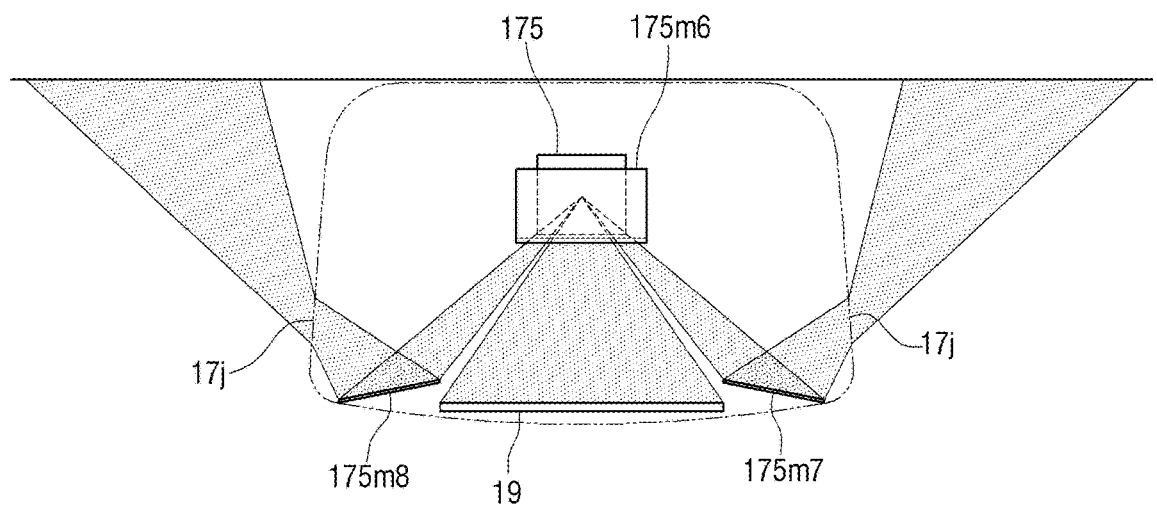

FIG. 9 is a view illustrating an example of a method for controlling an air conditioner according to another embodiment of the present disclosure. FIGS. 10 and 11 are schematic cross-sectional views illustrating optical paths in a projector of an air conditioner according to another embodiment of the present disclosure.

Returning to operation S320 of FIG. 3, if the selection of the image external output button is not received, the process proceeds to operation S340.

At operation S340 of FIG. 3, a selection of an operation mode button is received.

The air conditioner 100 may receive a control signal that corresponds to user's selection of the operation mode button (not illustrated) among the buttons 160 and user's selection of the operation mode button 203 of the remote controller 200 through the optical receiver 150. Further, the air conditioner 100 may receive a control signal that corresponds to the user's selection of the operation mode button 203 of the remote controller 200 through the communicator 120.

The controller 110 of the air conditioner 100 may control the air conditioner 100 to operate in one of a cooling mode, a dehumidifying mode, and an air purifying mode to correspond to the selection of the operation mode button (or reception of the control signal that corresponds to the selection of the operation mode button). Further, the controller 110 of the air conditioner 100 may control the air conditioner 100 to operate in one of a wind speed mode, blowing mode, and heating mode to correspond to the selection of the operation mode button (or reception of the control signal that corresponds to the selection of the operation mode button). The above-described operation mode is exemplary, and it can be easily understood by those of ordinary skill in the art to which the present disclosure pertains that the operation mode may be added, changed, or deleted to correspond to the function and/or the operation of the air conditioner 100.

At operation S350 of FIG. 3, reception of the image external output button selection is determined.

The controller 110 may determine the reception of the selection of the image external output button through reception of the control signal that corresponds to the selection of the button 160 or the selection of the button 202 of the remote controller 200.

Since the determination of the reception of the image external output button selection at operation S350 of FIG. 3 is substantially similar (e.g., difference in operations) to the determination of the reception of the image external output button selection at operation S320 of FIG. 3, duplicate explanation thereof will be omitted. Further, since the image external output button reception information at operation S350 of FIG. 3 is substantially similar (e.g., difference in operations) to the image external output button reception information at operation S320 of FIG. 3, duplicate explanation thereof will be omitted.

At operation S350 of FIG. 6, if the selection of the image external output button is received, the process proceeds to operation S360. Further, at operation S350 of FIG. 6, if the selection of the image external output button is not received, the process proceeds to operation S370.

At operation S360 of FIG. 6, the image that corresponds to the operation (or state) of the air conditioner is output to the display plate, and the image is output to the periphery of the air conditioner.

Referring to FIGS. 9 to 11, and 14, the controller 110 may operate the projector 175 to correspond to the selection of the image external output button (or reception of the control signal that corresponds to the selection of the image external output button).

Under the control of the controller 110, light (or image) 19f that is output from the projector 175 may be reflected by a first mirror 175m6 and may be output to the display plate 19.

Under the control of the controller 110, light (or image) 19v that is output from the projector 175 may be initially reflected by the first mirror 175m6, may be reflected by second mirrors 175m7 and 175m8, respectively, and then may be output to the outside through the opening 17j that is formed on the side housing 10c of the air conditioner 100. Further, under the control of the controller 110, the light (or image) 19v that is output from the projector 175 may be initially reflected by the first mirror 175m6, may be reflected by the second mirrors 175m7 and 175m8, respectively, may be finally reflected by an added third mirror (e.g., located between the second mirrors 175m7 and 175m8 and the opening 17j, not illustrated), and then may be output to the outside through the opening 17j that is formed on the side housing 10c of the air conditioner 100.

In an embodiment of the present disclosure, the lights (or images) that are output from the projector 175 may be discriminated from each other. The light (or image) that is output from the projector 175 may be discriminated as the image 19f that is output to the display plate 19 and the image 19v that is output to the periphery of the air conditioner 100. For example, the light (or image) that is output from the projector 175 may be discriminated as the image 19f that is output to the display plate 19 and the image 19v that is output to the periphery of the air conditioner 100 by the first mirror 175m6 and the second mirrors 175m7 and 175m8.

Under the control of the controller 110, the projector 175 may separate and output the image 19f that is displayed on the display plate 19 and the image 19v that is displayed on the periphery of the air conditioner 100. For example, the light (or image) that is output from the projector 175 may be separated into the image 19f that is output to the display plate 19 and the image 19v that is output to the periphery of the air conditioner 100, and may be respectively output by the first mirror 175m6 and the second mirrors 175m7 and 175m8. Further, the light (or image) that is separated into the image 19f that is output to the display plate 19 and the image 19v that is output to the periphery of the air conditioner 100 to be output from the projector 175 may be respectively output through the first mirror 175m6 and the second mirrors 175m7 and 175m8.

The locations, sizes, and/or angles of the second mirrors 175m7 and 175m8 (e.g., the angle between the second mirrors 175m7 and 175m8, the angle between the second mirror 175m7 and the side housing 10c, and the angle between the second mirror 175m8 and the side housing 10c) may be changed to correspond to the location and/or the size (e.g., width×length) of the opening 17j that is formed on the side housing 10c.

In an embodiment of the present disclosure, the second mirrors 175m7 and 175m8 may be located in a place where the image 19f that is output to the display plate 19 is not obscured. For example, the second mirrors 175m7 and 175m8 may be located on the side surface of the display plate 19 (e.g., a region where the output image 19f is not obscured). Further, the second mirrors 175m7 and 175m8 may be located in the rear of the display plate 19 (e.g., a region which is located between the display plate 19 and the first mirror 175m6 and in which the output image 19f is not obscured).

The distances and/or the angles between the first mirror 175m6 and the second mirrors 175m7 and 175m8 (e.g., the angle between the first mirror 175m6 and the second mirror 175m7, the angle between the second mirror 175m7 and the side housing 10c, and the angle between the second mirror 175m8 and the side housing 10c) may be changed to correspond to the location and/or the size (e.g., width×length) of the opening 17j that is formed on the side housing 10c.

In an embodiment of the present disclosure, the size of the second mirrors 175m7 and 175m8 of FIG. 10 may be smaller than the size of the second mirrors 175m4 and 175m5 of FIG. 8. In an embodiment of the present disclosure, the size of the second mirrors 175m7 and 175m8 of FIG. 10, which corresponds to the image 19v that is output to the periphery of the air conditioner 100 of the image 19f that is output to the display plate 19 and the image 19v that is output to the periphery of the air conditioner 100, may be smaller than the size of the second mirrors 175m4 and 175m5 of FIG. 8.

In an embodiment of the present disclosure, the controller 110 may operate to output the image 19v only to one side of the outside of the air conditioner 100 using the projector 175 and the mirrors 175m6 and 175m7, or 175m6 and 175m8 to correspond to the selection of the image external output button (or reception of the control signal that corresponds to the selection of the image external output button).

At operation S360 of FIG. 6, if the image is output to the display plate and to the periphery of the air conditioner, the method for controlling the air conditioner is ended.

Returning to operation S350 of FIG. 3, if the selection of the image external output button is not received, the process proceeds to operation S370.

At operation S370 of FIG. 6, an image that corresponds to the operation (or state) of the air conditioner is output to the display plate.

Referring to FIGS. 1 and 9 to 11, the controller 110 may operate the projector 175 to correspond to the selection of the operation mode button (or reception of the control signal that corresponds to the selection of the operation mode button).

Under the control of the controller 110, the light (or image) 19f that is output from the projector 175 may be reflected by the first mirror 175m6 and may be output to the display plate 19.

The controller 110 may control the projector 175 to output only the image 19f that is displayed on the display plate 19 to correspond to the selection of the operation mode button (or reception of the control signal that corresponds to the selection of the operation mode button). The controller 110 may control the projector 175 to output only the image 19f (e.g., the image that corresponds to the operation (or state) of the air conditioner) that is displayed on the display plate 19 to correspond to the selection of the operation mode button (or reception of the control signal that corresponds to the selection of the operation mode button).

At operations S370 and S360 of FIG. 6, duplicate explanation thereof may be omitted.

At operation S360 of FIG. 6, if the image is output to the display plate, the method for controlling the air conditioner is ended.

Figure 12:
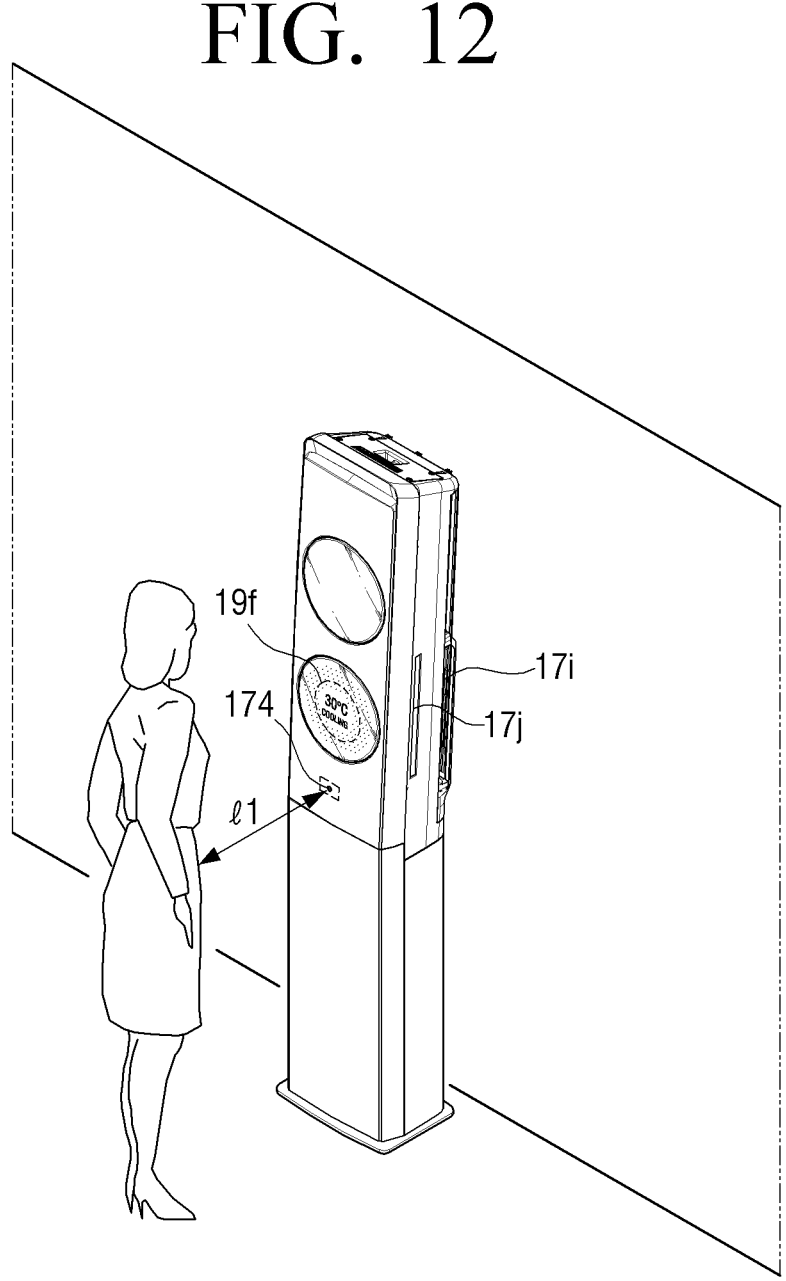
FIG. 12 is a view illustrating an example of a method for controlling an air conditioner according to still another embodiment of the present disclosure.
Figure 13:
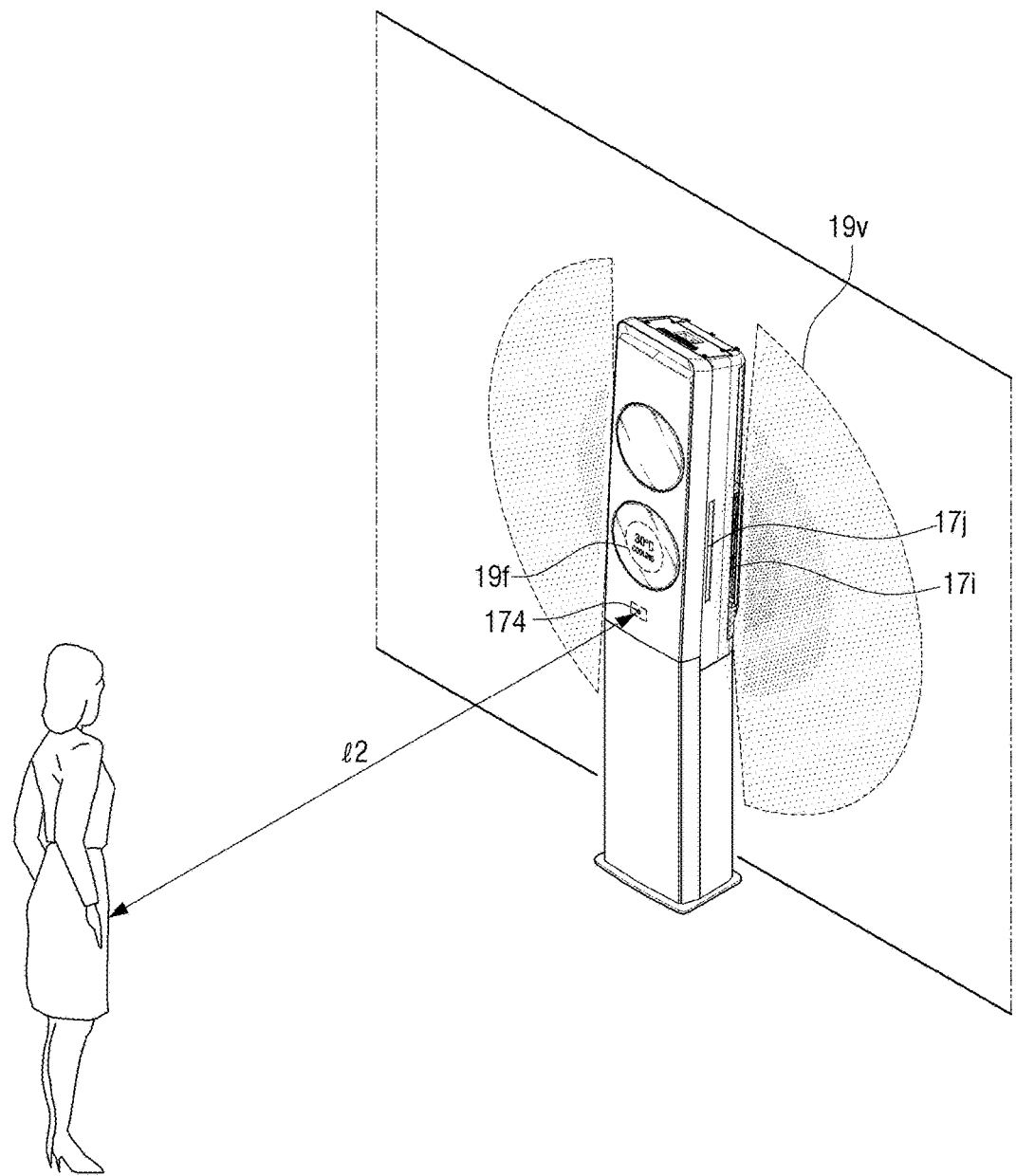
FIG. 13 is a view illustrating an example of a method for controlling an air conditioner according to still another embodiment of the present disclosure.

FIG. 12 is a view illustrating an example of a method for controlling an air conditioner according to still another embodiment of the present disclosure, and FIG. 13 is a view illustrating an example of a method for controlling an air conditioner according to still another embodiment of the present disclosure.

Referring to FIGS. 12 to 14, the air conditioner 100 may include a proximity sensor 174. The proximity sensor 174 may be located on at least one of the front housing 10a, the side housing 10c, and the upper housing 10d of the air conditioner 100. The proximity sensor 174 of the air conditioner 100 may detect the distance between a user and the air conditioner 100. The proximity sensor 174 may output an electrical signal that corresponds to the distance between the user and the air conditioner 100 to the controller 110. The controller 110 may calculate the distance between the user and the air conditioner 100 using the electrical signal.

The controller 110 of the air conditioner 100 may control the air conditioner 100 to correspond to the distance l1 and l2 between the user and the air conditioner 100.

Referring to FIG. 12, the controller 110 of the air conditioner 100 may change the image that is output from the projector 175 to correspond to the distance l1 and l2 between the user and the air conditioner 100. For example, if the distance between the user and the air conditioner 100 is short (e.g., l1≤1 m, l1 can be changed according to settings), the controller 110 may operate to output the image 19f only to the display plate 19 using the projector 175. Further, if the distance between the user and the air conditioner 100 is short (e.g., l1≤1 m, l1 can be changed according to settings), the controller may operate not to output the image 19v to the outside of the air conditioner 100 using the projector 175.

Referring to FIGS. 13 and 14, the controller 110 of the air conditioner 100 may operate to output the image through the projector 175 to correspond to the distance (l1<l2) between the user and the air conditioner 100. For example, if the distance between the user and the air conditioner 100 is long (e.g., l1<l2, l2≥3.5 m, l1 and l2 can be changed according to settings), the controller 110 may operate to output the image 19f to the display plate 19 and to output the image 19v to the periphery of the air conditioner 100 using the projector 175. Further, in the case where the distance between the user and the air conditioner 100 is long (e.g., l1<l2, l2≥3.5 m, l1 and l2 can be changed according to settings), the controller 110 may operate to output one of the image 19f to the display plate 19 and the image 19v to the periphery of the air conditioner 100 using the projector 175.

FIG. 14 is a diagram illustrating examples of images that are displayed on a display plate of an air conditioner according to embodiments of the present disclosure.

Referring to FIG. 14, examples of images that are displayed on at least one of the display plate 19 and the periphery of the air conditioner 100 are shown. The images that are shown in FIG. 14 may be an output 19f to the display plate 19 of the air conditioner 100, an output 19v to the periphery of the air conditioner 100, or both outputs 19f+19v including the output 19f to the display plate 19 and the output 19v to the periphery of the air conditioner 100.

Parts of the images 411 to 413, 421 to 423, 431 to 413, and 441 to 443 shown in FIG. 14 may be output to the display plate 19 as the output 19f, and the remainder thereof may be output to the periphery of the air conditioner 100 as the output 19v. The images 411 to 413, 421 to 423, 431 to 413, and 441 to 443 shown in FIG. 14 may differ in accordance with operation modes 420a to 420c. The images 411 to 413, 421 to 423, 431 to 413, and 441 to 443 shown in FIG. 14 may differ in accordance with the mode 410a, wind amount 410b, wind direction 410c, and calm 410d. Further, the images 411 to 413, 421 to 423, 431 to 413, and 441 to 443 shown in FIG. 14 may differ to correspond to the mode 410a, wind amount 410b, wind direction 410c, and calm 410d, which correspond to the horizontal axis, and the operation modes 420a to 420c, which correspond to the vertical axis.

The images 411 to 413, 421 to 423, 431 to 413, and 441 to 443 shown in FIG. 14 may include still images, and may be changed corresponding to an output time.

The methods according to exemplary embodiments of the present disclosure may be implemented in the form of a program command that can be performed through various computer means, and may be recorded on a computer readable medium. The computer readable medium may include program instructions, data files, and data structures solely or in combination. For example, the computer readable medium may be stored, regardless of whether it can be deleted or re-written, for example, in a volatile or nonvolatile storage device, such as a ROM, in a memory, such as a RAM, a memory chip, a device, or an integrated circuit, or in a storage medium that can be optically or magnetically recordable and readable through a machine (e.g., computer), such as a CD, a DVD, a magnetic disc, or a magnetic tape.

A memory that may be included in an air conditioner may be an example of a machine-readable storage medium that is suitable to store a program or programs including instructions for implementing the embodiments of the present disclosure. The program instructions may be specially designed and configured for the present disclosure, or may be known and can be used by computer software providers.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:
1. An air conditioner comprising:
a housing having a front surface including a plurality of openings and a side surface having a side opening;
a door plate located to correspond to a first opening among the plurality of openings;
a display plate located to correspond to a second opening among the plurality of openings;
a projector located inside the housing and configured to selectively output an image onto at least one of the display plate and a periphery of the air conditioner; and
a controller configured to control the projector,
wherein the image is output to the periphery of the air conditioner through the side opening.
2. The air conditioner as claimed in claim 1, wherein the image is projected onto a rear surface of the display plate and is viewable on a front surface of the display plate.
3. The air conditioner as claimed in claim 1, further comprising a plurality of mirrors, and
the image output from the projector is reflected by the plurality of mirrors onto a rear surface of the display plate.
4. The air conditioner as claimed in claim 3, wherein a location of the plurality of mirrors in the housing corresponds to a location of the side opening.
5. The air conditioner as claimed in claim claim 3, wherein an angle of the plurality of mirrors in the housing corresponds to a location of the side opening.

6. The air conditioner as claimed in claim 3, wherein a size of the image that is output onto the display plate corresponds to a distance between the projector and the plurality of mirrors.

7. The air conditioner as claimed in claim 1, wherein an optical path from the projector to the display plate is clear.

8. The air conditioner as claimed in claim 3, wherein the projector is located at a lower position in the housing relative to the plurality of mirrors and
wherein the image is output upward from the projector, and is reflected in a direction of the display plate through one of the plurality of mirrors.

9. The air conditioner as claimed in claim 3, wherein the image from the projector, is reflected in a direction of the display plate through one of the plurality of mirrors, and is reflected in a direction of the side opening through another of the plurality of mirrors.

10. The air conditioner as claimed in claim 1, wherein a portion of the image is projected onto the display plate and a remainder of the image is output to the periphery of the air conditioner.

11. The air conditioner as claimed in claim 1, further comprising a button,
wherein the controller controls the projector to project the image based on an operation of the button.

12. The air conditioner as claimed in claim 1, further comprising a communicator wirelessly connected to a remote controller configured to receive a user input,
wherein the controller controls the projector to project the image based on a control command, corresponding to the user input, from the remote controller received through the communicator.

13. The air conditioner as claimed in claim 1, further comprising an optical receiver configured to receive an optical signal that is output from a remote controller configured to receive a user input,
wherein the controller controls the projector to project the image based on a control command, corresponding to the user input, in the optical signal from the remote controller received through the optical receiver.

14. The air conditioner as claimed in claim 1, further comprising a proximity sensor configured to detect a distance between a user and the air conditioner,
wherein the controller controls the projector to project the image to at least one of the display plate and a periphery of the air conditioner based on the detected distance between the user and the air conditioner.

15. A method for controlling an air conditioner, comprising:
supplying power to the air conditioner based on an operation of a power button located on a housing of the air conditioner;
receiving an operation of an image external output button located on the housing to project an image from a projector located inside the air conditioner such that the projected image is viewable from an outside of the air conditioner; and
reflecting the image from the projector through a mirror located inside the air conditioner based on the operation of the image external output button, and outputting the reflected image to the outside of the air conditioner through a side opening formed on a side surface of the air conditioner.

16. The method as claimed in claim 15, further comprising receiving an operation of an operation mode button for selecting an operation mode of the air conditioner,
wherein the image is projected, based on the operation of the operation mode button and the operation of the image external output button, from the projector onto at least one of:
a rear surface of a display plate of the air conditioner such that the image is viewable on a front surface of the display plate, and
the mirror and reflected to the outside of the air conditioner through the side opening of the air conditioner.

17. The method as claimed in claim 15, wherein at least one of the operation of the power button, the operation of the image external output button, and an operation of an operation mode button for selecting an operation mode of the air conditioner is included in a control signal received from a remote controller through one of a communicator and an optical receiver of the air conditioner.

* * * * *